(12) United States Patent
Lee-Baron et al.

(10) Patent No.: US 9,740,426 B2
(45) Date of Patent: Aug. 22, 2017

(54) DRIVE ARRAY POLICY CONTROL

(71) Applicant: Lenovo (Singapore) Pte. Ltd., Singapore (SG)

(72) Inventors: Jennifer J. Lee-Baron, Morrisville, NC (US); Amy Leigh Rose, Chapel Hill, NC (US); Nathan J. Peterson, Durham, NC (US); John Scott Crowe, Durham, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 63 days.

(21) Appl. No.: 14/491,770

(22) Filed: Sep. 19, 2014

(65) Prior Publication Data
US 2016/0085451 A1 Mar. 24, 2016

(51) Int. Cl.
    *G06F 11/20* (2006.01)
    *G06F 3/06* (2006.01)

(52) U.S. Cl.
    CPC ............. *G06F 3/065* (2013.01); *G06F 3/061* (2013.01); *G06F 3/0619* (2013.01); *G06F 3/0659* (2013.01); *G06F 3/0689* (2013.01)

(58) Field of Classification Search
    CPC .................................................... G06F 11/008
    USPC ......................................................... 714/6.12
    See application file for complete search history.

(56) References Cited

U.S. PATENT DOCUMENTS

| 8,161,237 | B2 | 4/2012 | Hobbet et al. | |
|---|---|---|---|---|
| 8,719,495 | B2 | 5/2014 | Frame et al. | |
| 9,122,588 | B1* | 9/2015 | Mondal | G06F 12/0246 |
| 2003/0097524 | A1* | 5/2003 | Brant | G06F 3/0601 |
| | | | | 711/114 |
| 2005/0076260 | A1* | 4/2005 | Hung | G06F 11/1092 |
| | | | | 714/6.12 |
| 2006/0277422 | A1* | 12/2006 | Berke | G11O 5/141 |
| | | | | 713/300 |
| 2007/0266056 | A1* | 11/2007 | Stacey | G06F 17/30221 |
| 2009/0293051 | A1* | 11/2009 | Krywaniuk | G06F 8/63 |
| | | | | 717/173 |
| 2011/0246723 | A1* | 10/2011 | Van Der Wolf | G06F 12/0804 |
| | | | | 711/143 |
| 2013/0117626 | A1* | 5/2013 | Penzes | G06F 12/0864 |
| | | | | 714/758 |

(Continued)

OTHER PUBLICATIONS

LSI, "MegaRAID SAS 9260CV-4i and SAS 9260CV-8i RAID Controllers", 49660-00, Revision A, Dec. 2010 (12 pages).

(Continued)

*Primary Examiner* — Kamini Patel
(74) *Attorney, Agent, or Firm* — Brian J. Pangrle

(57) ABSTRACT

An apparatus can include an interface; cache memory; a plurality of drives; and a controller that includes detection circuitry, a write through mode and a write back mode, where the write through mode writes information received via the interface to the plurality of drives, where the write back mode writes information received via the interface to the cache memory and writes information written to the cache memory to the plurality of drives, and where the detection circuitry selects the write through mode based at least in part on detection of a first condition and selects the write back mode based at least in part on detection of a second condition, where the first condition and the second condition differ.

18 Claims, 12 Drawing Sheets

(56) References Cited

U.S. PATENT DOCUMENTS

| | | | | |
|---|---|---|---|---|
| 2013/0212323 A1* | 8/2013 | Hashimoto | ............ | G06F 3/0616 |
| | | | | 711/103 |
| 2014/0095775 A1* | 4/2014 | Talagala | .............. | G06F 12/0866 |
| | | | | 711/103 |
| 2014/0143505 A1* | 5/2014 | Sim | ..................... | G06F 12/0804 |
| | | | | 711/143 |
| 2014/0365817 A1* | 12/2014 | Tanaka | ................ | G06F 11/2094 |
| | | | | 714/6.21 |
| 2015/0135003 A1* | 5/2015 | Cota-Robles | ....... | G06F 11/1666 |
| | | | | 714/6.3 |
| 2015/0186160 A1* | 7/2015 | Arora | ................. | G06F 9/44505 |
| | | | | 713/1 |
| 2015/0286438 A1* | 10/2015 | Simionescu | ........ | G06F 12/0866 |
| | | | | 711/103 |
| 2015/0293699 A1* | 10/2015 | Bromley | .............. | G06F 3/0641 |
| | | | | 711/161 |

OTHER PUBLICATIONS

LSI, "LSI MegaRAID CacheVault Technology", 2012 (2 pages).
LSI, "MegaRAID SAS 9271-8i", 2014 (2 pages).
LSI, "6Gb/s MegaRAID SAS RAID Controllers, User Guide", 41450-04, Rev. C, Aug. 2013 (92 pages).

* cited by examiner

DRIVE ARRAY POLICY CONTROL

TECHNICAL FIELD

Subject matter disclosed herein generally relates to technologies and techniques for storage drives.

BACKGROUND

An array of storage drives can store information and may be, for example, part of an information handling system (e.g., a server, a desktop computer, etc.).

SUMMARY

An apparatus can include an interface; cache memory; a plurality of drives; and a controller that includes detection circuitry, a write through mode and a write back mode, where the write through mode writes information received via the interface to the plurality of drives, where the write back mode writes information received via the interface to the cache memory and writes information written to the cache memory to the plurality of drives, and where the detection circuitry selects the write through mode based at least in part on detection of a first condition and selects the write back mode based at least in part on detection of a second condition, where the first condition and the second condition differ. Various other apparatuses, systems, methods, etc., are also disclosed.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
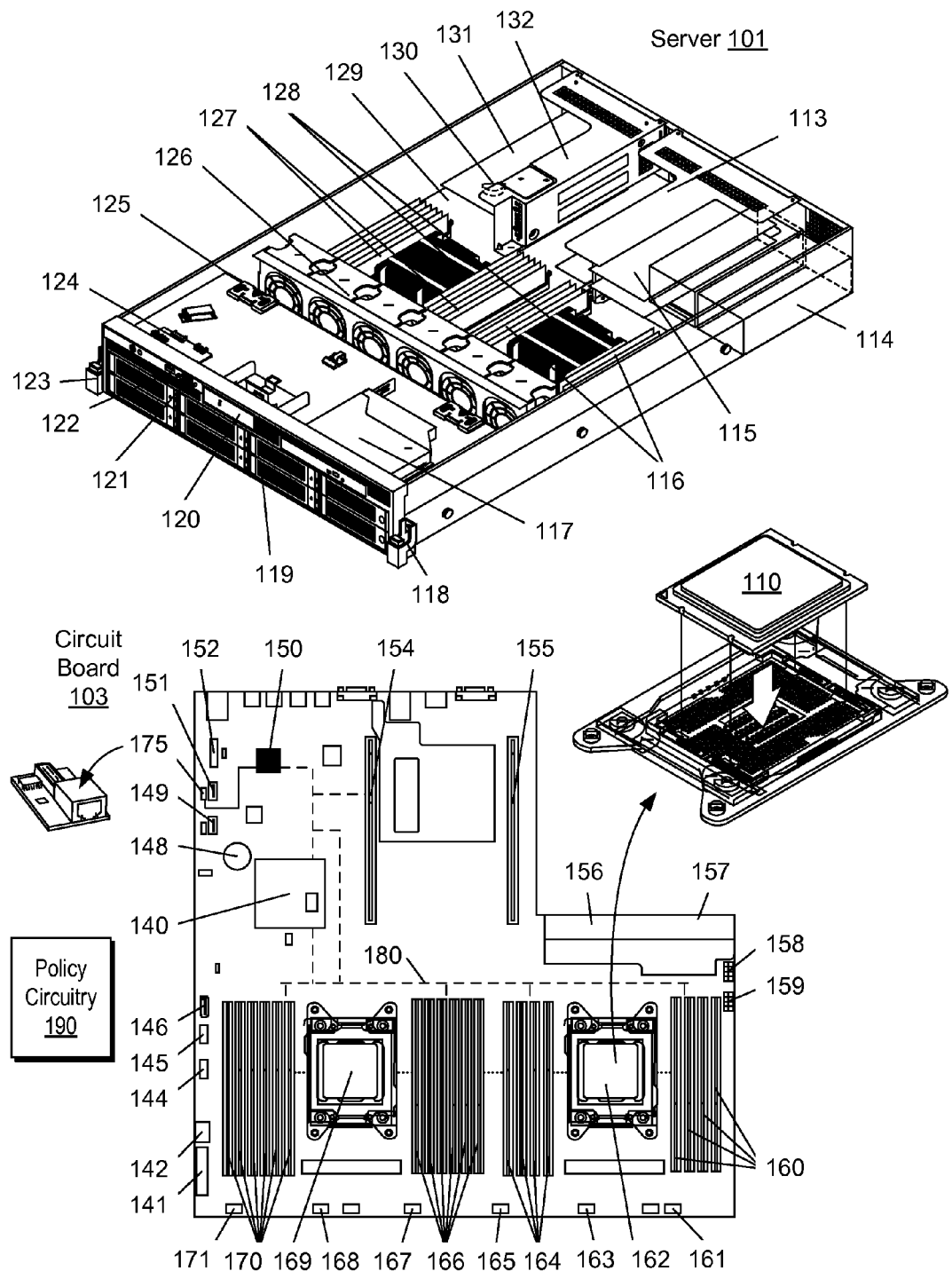
FIG. 1 is a diagram of an example of a server and an example of a board with various components.

The following description includes the best mode presently contemplated for practicing the described implementations. This description is not to be taken in a limiting sense, but rather is made merely for the purpose of describing general principles of the implementations. The scope of the described implementations should be ascertained with reference to the issued claims.

Information may be stored to one or more of a plurality of drives where the plurality of drives may be defined as a "redundant array". For example, consider a redundant array of independent drives where the drives may be disk drives. Such an array may be referred to as a RAID that may be operated according to a scheme. Various types of schemes exist for a RAID where, for example, a scheme may be a level of a plurality schemes that form a series of levels. For example, consider RAID 0, RAID 1, RAID 2, RAID 3, etc.

As an example, a level RAID 0 can include striping without parity or mirroring. RAID 0 does not provide data redundancy nor fault tolerance. However, RAID 0 may improve performance through parallelism of read and write operations across multiple drives. RAID 0 has no error detection mechanism; thus, failure of one drive can cause loss of data in an array.

As an example, RAID 1 can include mirroring without parity or striping. In RAID 1, data may be written identically to two (or more) drives to produce a mirrored set. For RAID 1, a read request for data may access one of a plurality of drives that include the requested data. Such an approach may improve performance where, for example, data are read from a drive with the least seek latency and rotational latency. However, write performance may be degraded as an update is specified to update the drives in the array, which makes the slowest drive rate limiting. For RAID 1, an array can continue to operate as long as at least one drive is functioning.

As an example, RAID 2 can include bit-level striping with dedicated Hamming-code parity. In RAID 2, for an array of disk drives, disk spindle rotation can be synchronized and data can be striped such that each sequential bit is on a different drive. In RAID 2, Hamming-code parity may be calculated across corresponding bits and stored on at least one parity drive.

As an example, RAID 3 can include byte-level striping with dedicated parity. In RAID 3, for an array of disk drives, disk spindle rotation can be synchronized and data can be striped such that each sequential byte is on a different drive. In RAID 3, parity can be calculated across corresponding bytes and stored on a dedicated parity drive.

As an example, RAID 4 can include block-level striping with dedicated parity. As an example, a level called RAID-DP may operate with some aspects of RAID 4 where two parity drives may be used.

As an example, RAID 5 can include block-level striping with distributed parity. In RAID 5, parity information can be distributed among drives. A condition of RAID 5 may be that all drives but one be present for RAID 5-based operation. In RAID 5, upon failure of a single drive, subsequent reads can be calculated from the distributed parity such that data are not lost. Implementation of RAID 5 involves at least three drives.

As an example, RAID 6 can include block-level striping with double distributed parity. In RAID 6, double parity can provide fault tolerance for up to two failed drives. As with RAID 5, a single drive failure can result in reduced performance of an array (e.g., until the failed drive has been replaced). An implementation of RAID 6 may involve an array with drives from multiple sources (e.g., different manufacturers, etc.).

Other types of schemes exist, for example, consider RAID 0+1, which can create a second striped set to mirror a primary striped set, and RAID 1+0, which can create a striped set from a series of mirrored drives (e.g., also consider (RAID 10, RAID 50, RAID 60, etc.).

As to writing data to a RAID, various approaches exist. For example, consider a write through cache approach where data are written to both a cache device and a drive (or drives) once the data is retrieved. As the data are written to both a cache device and at least one drive, where the data are requested, they can be retrieved from the cache device, which may provide faster access when compared to retrieval from a drive. In a write through cache approach, an amount of time to perform a write operation for data can be greater than an amount of time to perform a write for the data to a non-cache device. In other words, the total write time can be the time to write to the cache device plus the time to write to at least one drive.

As another example, a write back cache approach may be implemented. In a write back cache approach, a write operation does not encounter a write time delay as in the write through cache approach. For example, a block of data may be initially written to a cache device and, where a condition occurs, the data may be written from the cache device to a drive. In such an example, a cache full condition may cause data to be written from the cache device to a drive. In a write back cache approach, if the cache device fails, loses power, etc., data may be lost due to the volatile nature of memory of the cache device. Thus, in a write back cache approach, if one or more preventive measures are not implemented, a period of time can exist where data may be at risk of loss. As an example, a preventive measure may be a battery backup module that can provide power to a cache device, for example, where a power source has failed.

As explained above, a write through cache approach may write data synchronously to a cache device and to a non-volatile storage device (e.g., one or more drives); whereas, a write back cache approach may initially write data to a cache device and then, after an amount of time, write the data to a non-volatile storage device (e.g., one or more drives) where the amount of time may depend on a cache block or blocks of the cache device, which contain the data, being about to be modified and/or replaced (e.g., by different data). As an example, a write through cache approach may be referred to as a parallel approach as to writing of data to volatile memory and non-volatile memory and a write back cache approach may be referred to as a series approach as to writing of data to volatile memory and then from the volatile memory to non-volatile memory.

As an example, a RAID approach may be set based in part on one or more parameters. For example, a jumper may be set on a RAID controller to cause the RAID controller to operate in a write through cache approach or to cause the RAID controller to operate in a write back cache approach. In such an example, the jumper (e.g., or jumpers) may be physically moved to select write through cache operation or write back cache operation. Where a jumper is implemented, such an approach may be referred to as being selectable and "hard wired" (e.g., a jumper may electrically connect pins). As an example, where an approach is not-selectable by setting a parameter via a jumper, setting a parameter via a firmware option, etc., such an approach may be referred to as being "hard wired" (e.g., consider a manufactured controller that is fixed with respect to its RAID approach). Hard wire approaches to RAID management may be considered static as they do not allow for changes in operation while a RAID is up and running (e.g., ready to perform or performing input and/or output operations).

As an example, a tunable approach to RAID operation may allow for adjustment to one or more parameters while a RAID is up and running. For example, a tunable approach may set a parameter to select write through cache operation or write back cache operation without taking a RAID off-line (e.g., powering down, etc.).

As an example, a tunable approach may be dynamic in that an operational mode may change automatically in response to one or more conditions. For example, a condition indicative of an impending power stability issue may cause a change from a write back cache operational mode to a write through cache operational mode. As an example, such a condition may generate a signal that can be received by a RAID controller where receipt of the signal can cause the RAID controller to change its operational mode. As an example, when a stability condition dissipates (e.g., risk of power instability diminishes, etc.), a tunable approach may cause another change, for example, from a write through cache operational mode to a write back cache operational mode.

As another example, an approach to RAID control may include receiving information as to a configuration of equipment and based on receipt of the information, selecting an operational mode, operational schedule, etc. For example, a component of a server (e.g., a baseboard management controller or "BMC") may monitor configuration of the server and output information (e.g., a signal, etc.) to a RAID controller. In such an example, the RAID controller, upon receipt of the information, can select a suitable operational mode, operational schedule, etc. Such an approach may be referred to as configuration-based tuning, which may optionally be dynamic where a change occurs in a configuration of equipment in that information associated with that change is transmitted to a RAID controller (e.g., in real time, etc.). As an example, a change in configuration may be used in tuning upon occurrence of a condition that may arise after the change in configuration. In such an example, a change may not immediately alter a current setting (e.g., at the time of the change) but may impact an adjustment to one or more settings at a future time.

As an example, in a high IOPS scenario, a user may want to use write back caching and/or disable consistency checking in an effort to prioritize performance. Whereas, in a low IOPS scenario (e.g., a trickle of data), a user may want to use write through (not caching) and/or enable consistency checking in an effort to prioritize data integrity.

As an example, a RAID controller may include circuitry that enables one or more of the following: (i) automatic detection of IOPS and setting RAID operational mode (e.g., caching approach) based on the IOPS (e.g., optionally in real time); (ii) manual programming of RAID operational mode, for example, according to a schedule (e.g., which may optionally vary from day-to-day, hour-to-hour, etc.); (iii) automatic tuning of one or more settings (e.g., parameters, etc.) based at least in part on historical IOPS.

FIG. 1 shows an example of a server 101 and an example of a circuit board 103 that may be part of the server 101. As shown in the example of FIG. 1, the server 101 can include a riser card assembly 113, one or more hot-swap power supplies 114, one or more PCI-express cards 115, a first set of DIMMs 116 (e.g., processor-accessible memory slots, memory modules, etc.), an optical drive 117, a right-side rack handle 118, a drive area 119, a diagnostic module 120, a VGA DB-connector 121, a USB port 122, a left-side rack handle 123, a front panel board 124, a backplane for drives 125, system fans 126, a second set of DIMMs 127, heat sinks (e.g., with processors beneath) 128, a circuit board (e.g., or system board) 129, a circuit board battery 130, one or more other PCI-express cards 131 (e.g., card slots) and another riser card assembly 132 (e.g., optionally to provide additional slots, etc.).

As to the circuit board 103, it may be suitable for use as the circuit board 129 of the server 101. As shown in the example of FIG. 1, the circuit board 103 can include a platform controller hub or host (PCH) 140, a front panel connector 141, an internal USB connector 142, a diagnostic module connector 144, a front VGA connector 145, a SATA connector 146, a circuit board battery 148, an internal USB Type A port 149, a controller 150 (e.g., a baseboard management controller), another internal USB Type A port 151, a TPM (Trusted Platform Module) connector 152 (e.g., to operatively couple to a TPM, another type of security module, etc.), a riser card assembly slot 154, another riser card assembly slot 155, a power supply connector 156, another power supply connector 157, a backplane power connector 158, another backplane power connector 159, memory slots 160, 164, 166 and 170 (e.g., that may be occupied by memory), system fan connectors 161, 163, 165, 167, 168 and 171 and processor sockets 162 and 169 where each of the processor sockets 162 and 169 may seat a respective processor (see, e.g., a perspective view of the processor socket 162 and a processor 110).

As an example, a processor may be in the form of a chip (e.g., a processor chip) that includes one or more processing cores. As an example, a processor socket may include protruding pins to make contact with pads of a processor chip, which may be, for example, a multicore processor chip (e.g., a multicore processor). As an example, a processor socket may include features of a "Socket H2" (Intel Corp, Santa Clara, Calif.), a "Socket H3" (Intel Corp, Santa Clara, Calif.), "Socket R3" (Intel Corp, Santa Clara, Calif.) or other socket. As an example, a processor chip (e.g., processor) may optionally include more than about 10 cores (e.g., "Haswell-EP", "Haswell-EX", etc. of Intel Corp.). As an example, a processor chip may include one or more of cache, an embedded GPU, etc.

As shown in the example of FIG. 1, the circuit board 103 may include a controller connector module 175, for example, operatively coupled to the controller 150 (e.g., via conductors, a bus, etc.). The controller connector module 175 may include, for example, network circuitry, a receptacle for a cable plug, etc. for network communications with the controller 150.

As an example, communications (e.g., signal sending, signal receipt, etc.) may occur according to a layer model. For example, such a model may include a Physical Layer (PHY) that can couple to a Media Access Control (MAC) and vice versa. For example, a PHY may be associated with an optical or wire cable and a MAC may be associated with a device (e.g., a link layer device, etc.) that may receive information from the PHY (e.g., received via a cable) and transmit information to the PHY (e.g., for transmission via a cable).

As an example, the controller connector module 175 of the circuit board 103 may provide for remote "keyboard, video and mouse" (KVM) access and control through a LAN and/or the Internet, for example, in conjunction with the controller 150, which may be a baseboard management controller (BMC). As an example, the controller connector module 175 may provide for location-independent remote access to one or more circuits of the circuit board 103, for example, to respond to incidents, to undertake maintenance, etc.

As an example, the controller connector module 175 may include circuitry for features such as an embedded web server, a soft keyboard via KVM, remote KVM, virtual media redirection, a dedicated Network Interface Card (NIC), security (e.g., SSL, SSH, KVM encryption, authentication using LDAP or RADIUS), email alert, etc.

As an example, the controller connector module 175 may be a network adapter (e.g., a network interface). For example, in the example of FIG. 1, the controller connector module 175 is shown as optionally including a receptacle that is configured to receive a plug (e.g., of a cable, etc.). As an example, a utility program may be provided for setting an IP address (e.g., a static IP address or dynamic IP address) for the controller 150. Such a program may include a BMC LAN configuration option and may include options for an identifier and a password. As an example, a controller may be accessed via an IP address (e.g., http://10.223.131.36), for example, using a web-browser program executing on a machine.

As an example, the controller 150 may include one or more MAC modules (e.g., one or more 10/100/1000 Mbps MAC modules, etc.), for example, that can be operatively coupled to PHY circuitry.

As an example, the controller connector module 175 may include PHY circuitry (e.g., it may be a PHY device or a "PHYceiver"). For example, the controller connector module 175 may include one or more PHY chips, for example, one for each MAC module of a controller where such a controller includes multiple MAC modules. An Ethernet PHY chip may implement hardware send and receive functions for Ethernet frames (e.g., interface to line modulation at one end and binary packet signaling at another end). As an example, a system may include so-called USB PHY circuitry (e.g., a PHY chip integrated with USB controller circuitry to bridge digital and modulated parts of an interface).

As an example, the controller connector module 175 may be integrated with the controller 150, for example, as an integrated management module. As an example, an integrated management module may include at least some features of the Integrated Management Module (IMM) as marketed by Lenovo (US) Inc., Morrisville, N.C. As an example, an integrated management module or the controller 150 and the controller connector module 175 may include circuitry for one or more of: (i) choice of dedicated or shared Ethernet connection; (ii) an IP address for an Intelligent Platform Management Interface (IPMI) and/or a service processor interface; (iii) an embedded Dynamic System Analysis (DSA); (iv) an ability to locally and/or remotely update other entities (e.g., optionally without requiring a server); (v) a restart to initiate an update process; (vi) enable remote configuration with an Advanced Settings Utility (ASU); (vii) capability for applications and tools to access the IMM in-band and/or out-of-band; and (viii) one or more enhanced remote-presence capabilities.

In the example of FIG. 1, the circuit board 103 includes various buses 180 that may provide access to memory such as, for example, memory associated with the slots 160, 164, 166 and 170. As an example, the controller 150 may be operatively coupled to one or more of the various busses 180, for example, to access information stored in memory, to store information in memory or to access information and to store information in memory. As an example, the controller 150 may access memory via the PCH 140, which may include a memory controller host (MCH) and an embedded controller (e.g., an ARC-based controller, an ARM-based controller, etc.), for example, as part of a chipset. As an example, the controller 150 may be configured for direct and/or indirect access to memory such as, for example, so-called "system" memory (e.g., memory associated with the slots 160, 164, 166 and 170).

As an example, the controller 150 may provide for monitoring, debugging, etc. operations of one or more components of the circuit board 103, for example, via access to memory. As an example, the controller 150 may provide for access to states of one or more processors such as, for example, the processor 110, which may include multiple cores and other circuitry. As an example, the controller 150 may optionally set a state of a processor as part of a debugging process, a reset process, etc. As an example, a controller 150 may interrupt operation of circuitry, assess information (e.g., memory, state information, etc.) associated with circuitry and then resume operation of circuitry.

As an example, the controller 150 may include information as to a configuration of the server 101. For example, the controller 150 may include memory with a listing of components (e.g., field replaceable units or "FRU"s and/or other components). In such an example, where a component is replaced, the controller 150 may update information. As an example, a component may be replaced with a different component. As an example, the controller 150 may monitor the server 101 for installation of equipment. For example, where a drive is replaced, removed and/or inserted, a RAID controller is replaced, removed and/or inserted (e.g., in a PCI slot, etc.; see, e.g., the riser 132, etc.), a cache module is replaced, removed and/or inserted, etc. the controller 150 may update configuration information for the server 101.

As an example, the controller 150 may include circuitry to monitor status of one or more power supply components, including, for example, one or more voltage regulators. As an example, the controller 150 may include circuitry to monitor status of one or more fans (see, e.g., the fan connectors 161, 163, 165, 167, 168 and 171; noting that a server may include one or more other fan connectors, one or more components with a fan or fans, etc.). In such examples, the monitoring by the controller 150 may provide for determining a power stability state (e.g., or status) of the server. For example, if a fan fails, a risk of overheating may exist where such overheating may trigger a shut-down of the server 101. In such an example, a risk of a shut-down due to an increase in temperature, failure of a fan, etc. may be considered to be a power stability state indicative of power instability. As another example, a voltage regulator that is failing may give rise to a risk of a shut-down.

As an example, the controller 150 may include circuitry that can shut-down the server 101 (e.g., in an effort to reduce damage thereto) where local and/or remote conditions become known. As to local conditions, these may be conditions directly associated with the server 101; whereas, remote conditions may be conditions as to weather, computer room air conditioning ("CRAC"), etc. For example, a remote condition may be an electrical storm, flooding, high winds, etc. that could impair operation of a facility and/or supply of power to the facility.

In the example of FIG. 1, the server 101 includes policy circuitry 190 that can select an operational policy associated with writing data to one or more drives. As an example, the policy circuitry 190 may be RAID controller policy circuitry. As an example, the policy circuitry 190 can include detection circuitry that can select one or more policies based at least in part on a detected condition. As an example, the policy circuitry 190 may include analyzing detected information and determining one or more parameters associated with selection of a policy or policies.

As an example, a server (e.g., or other information handling system) may include an interface; cache memory; a plurality of drives; and a controller that includes detection circuitry, a write through mode and a write back mode, where the write through mode writes information received via the interface to the plurality of drives, where the write back mode writes information received via the interface to the cache memory and writes information written to the cache memory to the plurality of drives, and where the detection circuitry selects the write through mode based at least in part on detection of a first condition and selects the write back mode based at least in part on detection of a second condition, for example, where the first condition and the second condition differ. In such an example, the detection circuitry may be policy circuitry such as the policy circuitry 190 of FIG. 1.

As an example, a controller may be a RAID controller such as a RAID controller card (e.g., a RAID adapter), a "RAID on a chip" ("ROC"), etc. In such an example, the controller may include the policy circuitry 190.

As an example, a controller may be a RAID controller peripheral such as, for example, a cache module, a back-up battery module (BBU module), a capacitor-based energy storage module, etc. In such an example, the controller may include the policy circuitry 190.

As an example, a controller may be a baseboard management controller (see, e.g., the controller 150). In such an example, the controller may include the policy circuitry 190.

As an example, one or more buses (see, e.g., the various buses 180) may be operatively coupled to a slot that can receive a RAID controller (e.g., RAID adapter, etc.). As an example, a bus such as an I$^2$C bus may be operatively coupled to an I$^2$C interface of a RAID controller card, for example, to allow information from the controller 150 (e.g., and/or one or more other components) to be transmitted to the RAID controller card. In such an example, information received by a RAID controller card may be used to determined and/or implement one or more policies (e.g., at least one or more write policies).

Figure 2:
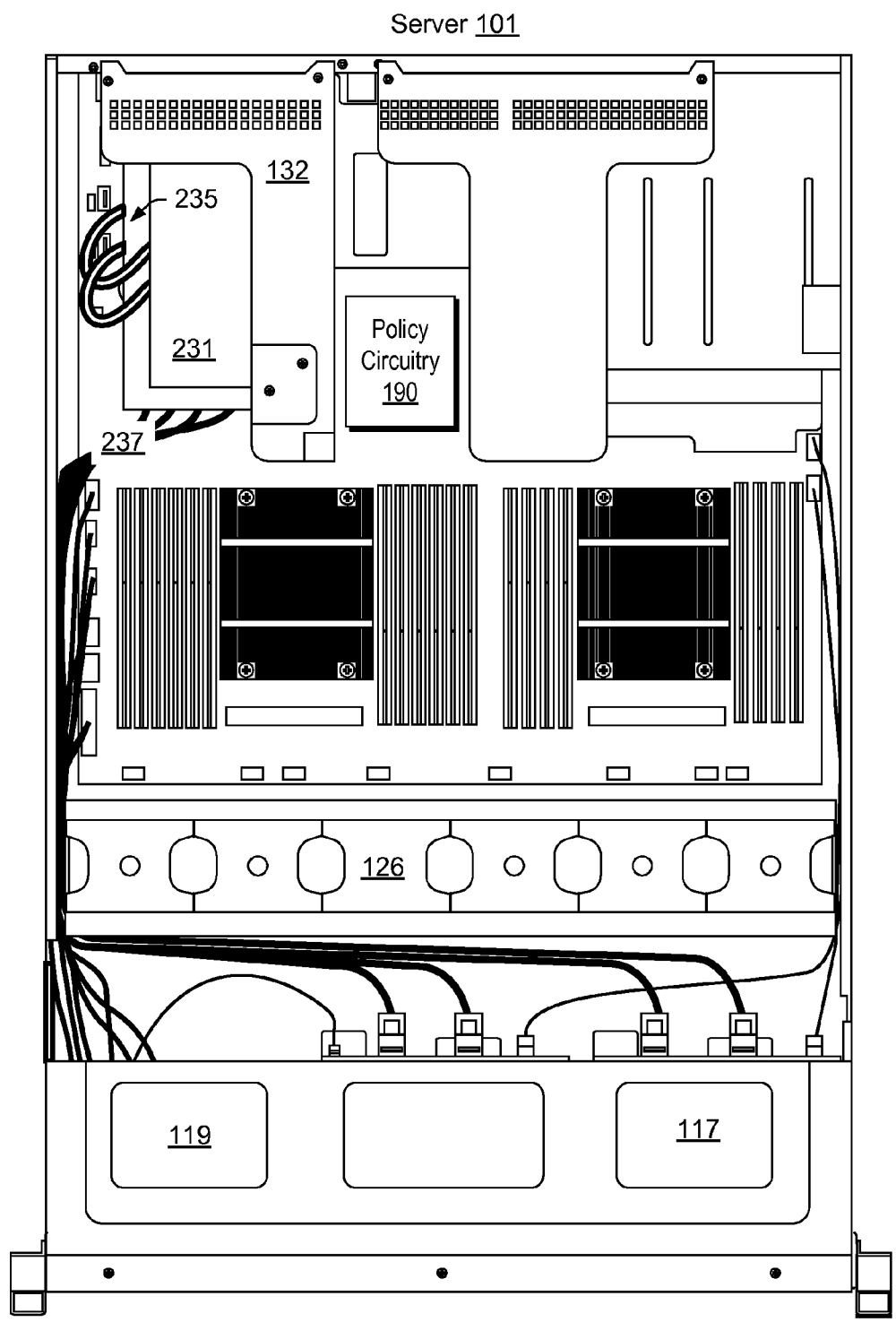
FIG. 2 is a diagram of an example of the server of FIG. 1 with a RAID controller card.

FIG. 2 shows an example of the server 101 with particular components installed as well as the policy circuitry 190. For example, the riser 132 is shown as including at least a RAID controller card 231 and various cables 235 and 237. As shown, the cables 237 extend to the optical drive 117 and to the drive area 119, which may include one or more drives (e.g., disk drives, etc.). The drive area 119 may include multiple drives that form a RAID controllable by the RAID controller card 231. As an example, the policy circuitry 190 may control one or more policies implemented by the RAID controller card 231. As an example, the policy circuitry 190 may be part of the RAID controller card 231.

Figure 3:
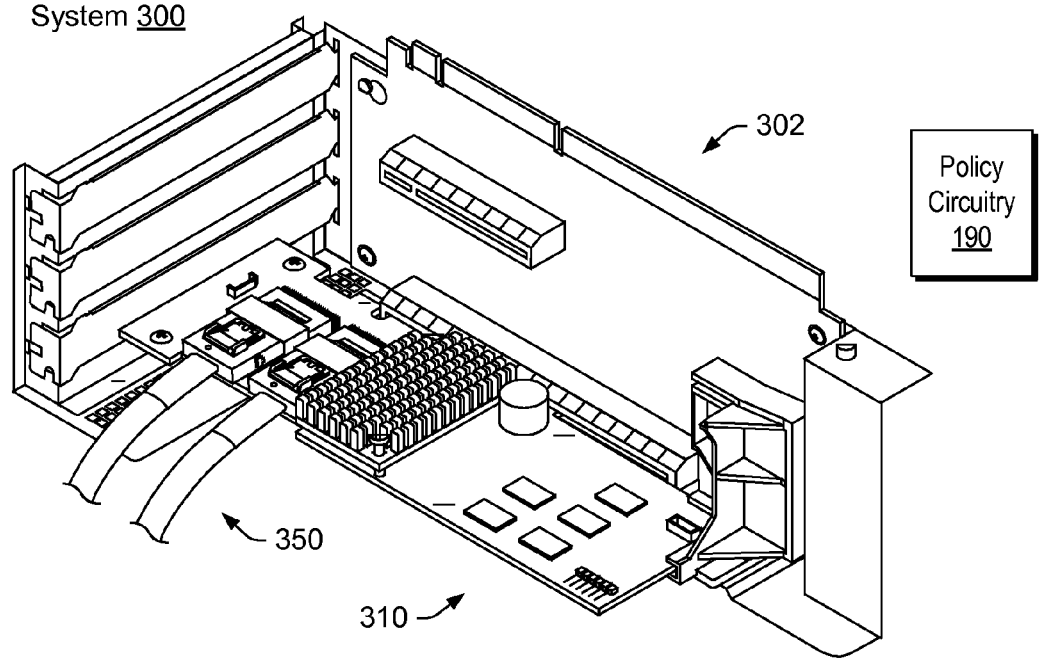
FIG. 3 is a diagram of examples of systems.
Figure 3:
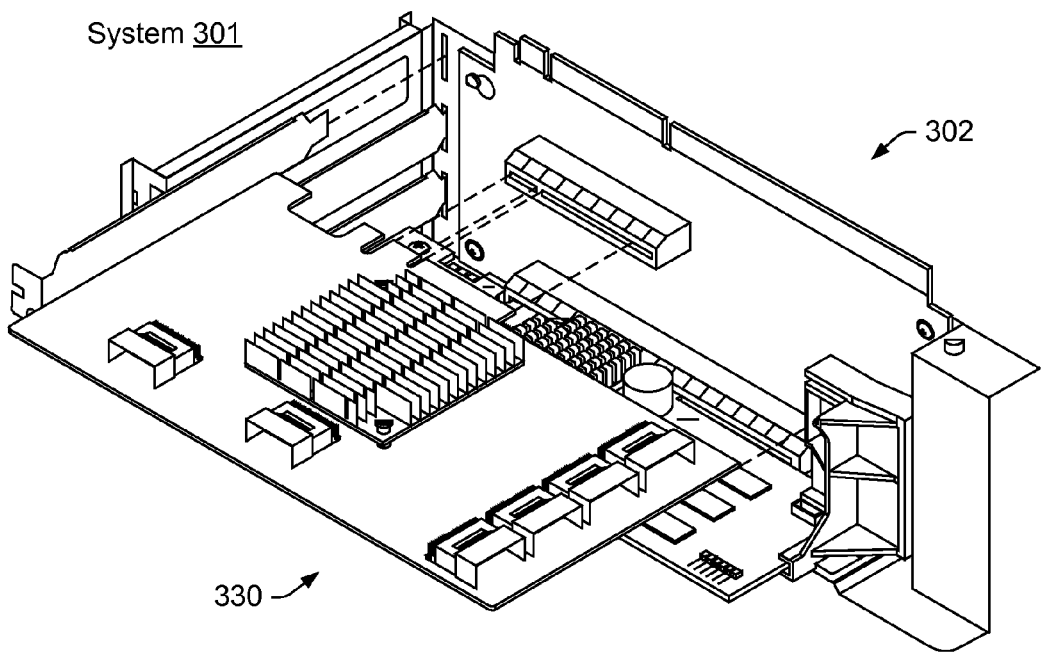

FIG. 3 shows an example of a system 300 that includes a RAID controller card 310 and cables 350 as well as an example of a system 301 that includes an optional expander card 330. Also shown as being part of the system 300 and/or the system 301 is the policy circuitry 190, which may act to control one or more policies of the RAID controller card 310.

As shown in FIG. 3, the card 310 and the card 330 may be received by a riser 302, which may be operatively coupled to a circuit board (e.g., via a slot, etc.). As shown in the example of FIG. 3, the cables 350 are received by ports of the RAID controller card 310. As an example, cables may be coupled to such ports and then to ports of the expander card 330 such that more ports are available (see, e.g., four ports on the edge of the expander card 330). As illustrated in FIG. 2, the cables 237 extend from a card, which may be an extender card such as the card 330 of FIG. 3, to drives of the drive area 119.

As an example, a RAID controller may operate according to one or more write policies (e.g., write operational approaches or modes). As an example, a write policy can define how a RAID controller uses cache when writing data to drives. In a write back mode, the RAID controller can send a data transfer completion signal to a host when the RAID controller associated cache has received all of the data in a transaction. Such a mode may be used with or without a RAID controller associated cache back-up battery (BBU); noting that without a battery, the cache may be unprotected such that a power failure or shut-down may lead to a risk of losing the data in the cache. In a write through mode, the RAID controller can send a data transfer completion signal to a host when a drive subsystem has received data in a transaction. Where a RAID controller associated cache back-up battery (BBU) is an integral option of a RAID controller, the RAID controller firmware may automatically switch to the write through mode if it detects a bad or missing BBU. In such an approach, where the BBU is not present or is bad, the RAID controller is fixed (e.g., "hard wired") into the write through mode. In the aforementioned scenario, an option may exist to avoid use of the write through mode where the BBU is absent or bad by fixing the RAID controller for operation in write back mode, however, that too may be considered a "hard wired" approach to RAID control (i.e., the RAID controller is fixed into the write back mode).

As an example, the policy circuitry 190 may implement one or more write policies that may be based on information received via equipment. For example, the policy circuitry 190 may include an interface that receives one or more signals from a baseboard management controller (BMC) as to a configuration of equipment, a status of equipment, etc. As an example, the policy circuitry 190 may include memory that stores a schedule where the schedule may be based on input by an operator (e.g., via a network connection, a USB drive, etc.) and/or based on sensed information (e.g., usage, power cycles, etc.). As an example, the policy circuitry 190 may include a tuner that can tune one or more parameters associated with operation of the RAID controller card 310 and/or the expander card 330. For example, the one or more parameters may be or include one or more write policy parameters. As an example, the policy circuitry 190 may be part of the controller card 310 and/or the expander card 330.

Figure 4:
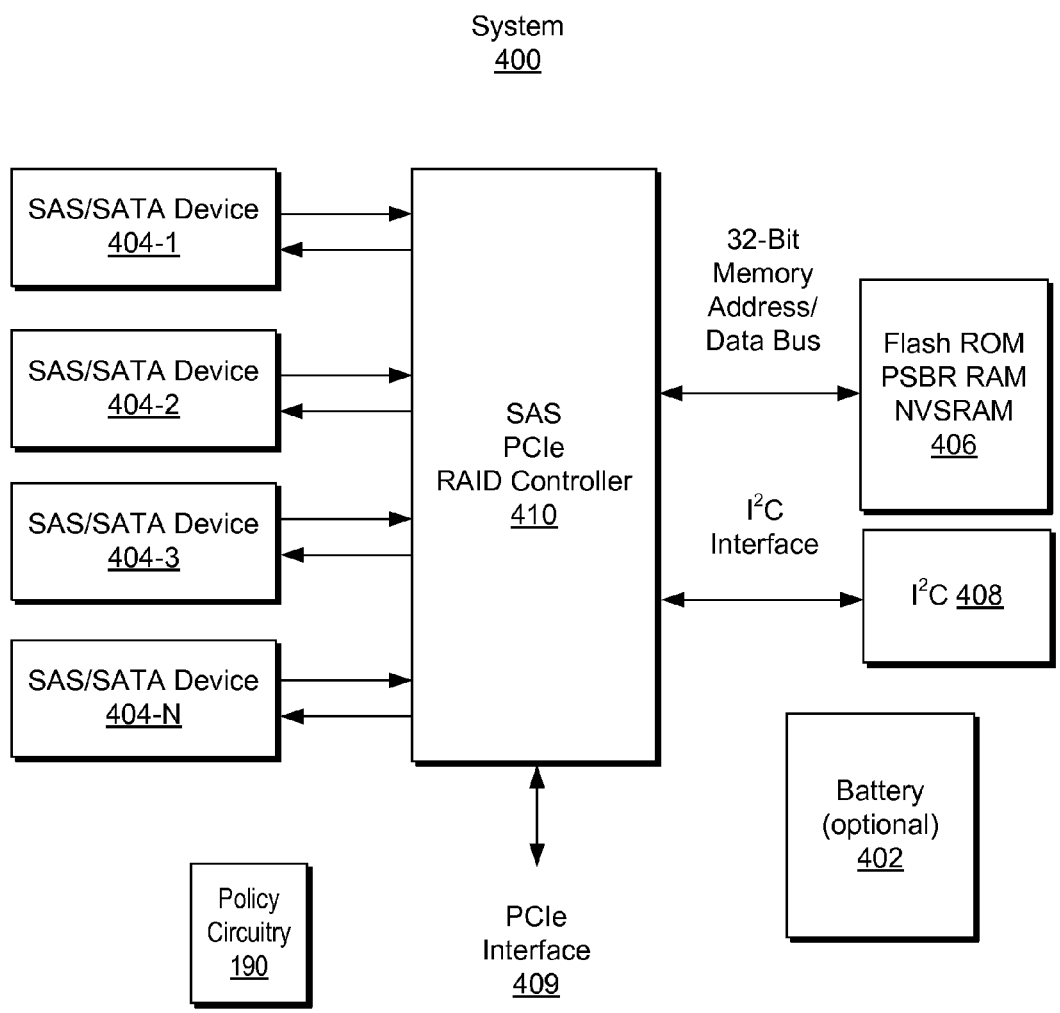
FIG. 4 is a diagram of an example of a system.

FIG. 4 shows a block diagram of an example of a system 400 that includes an optional battery 402, interfaces for a plurality of drives 404-1, 404-2, 404-3 to 404-N, a non-volatile memory bus module 406, a I²C module 408 (e.g., as part of an I²C interface), an PCIe interface 409 and a RAID controller 410. Also shown in the example system 400 of FIG. 4 is the policy circuitry 190.

The system 400 may be implemented to control drives such as SATA drives (e.g., I, II, III, etc.), optionally with an expander (e.g., a port expander). As an example, the I²C module 408 may allow for communication with one or more peripherals. The non-volatile memory bus module 406 may be a memory bus that provides for parity checking and chip select signals for pipelined synchronous burst static random access memory (PSBRAM), nonvolatile static random access memory (NVSRAM), and Flash ROM.

Figure 5:
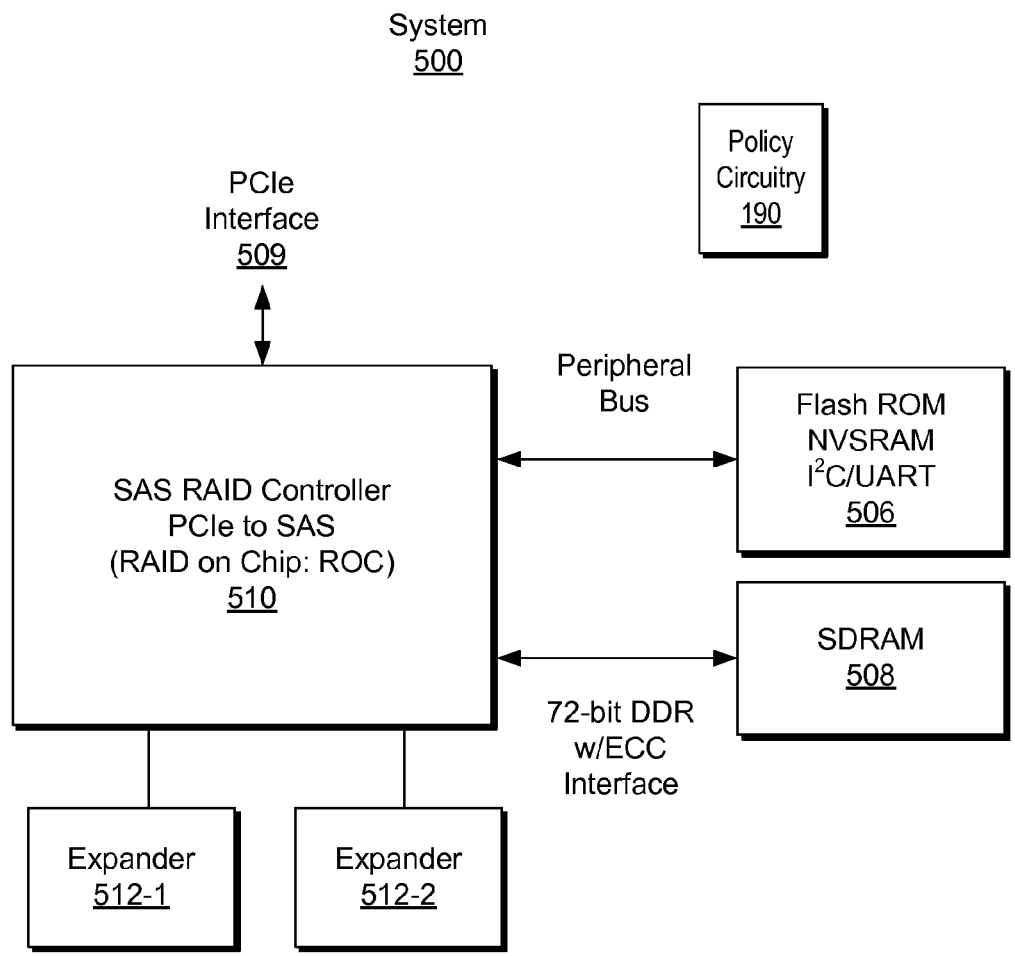
FIG. 5 is a diagram of an example of a system.

FIG. 5 shows an example of a system 500 that includes a peripheral bus module 506, a SDRAM module 508, a PCIe interface, a RAID controller 510 (e.g., optionally as a "RAID on chip") and expanders 512-1 and 512-2. Also shown in the example system 500 of FIG. 5 is the policy circuitry 190. As an example, the policy circuitry 190 may be part of the RAID controller 510, for example, part of a "RAID on chip" (e.g., "ROC").

Figure 6:
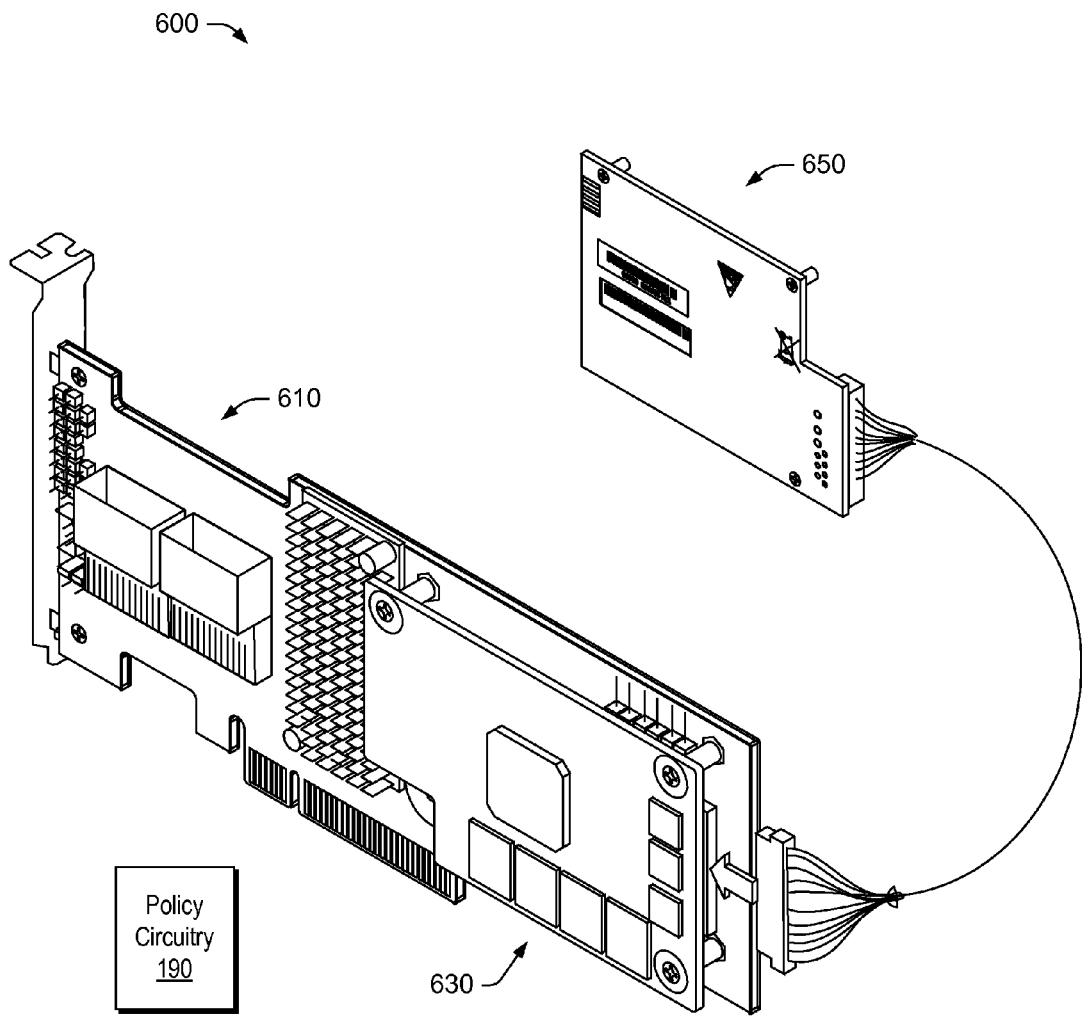
FIG. 6 is a diagram of an example of a system.

FIG. 6 shows an example of a RAID controller card 610 with a cache flash module 630 and a cache power module 650. As an example, the RAID controller card 610 may be configured as an about 6 Gb/s controller that can control about eight SAS/SATA ports. The cache flash module 630 may connect to the cache power module 650, for example, to provide back-up for data in case of power loss. Also shown in the example system 600 of FIG. 6 is the policy circuitry 190. As an example, the policy circuitry 190 may be part of the RAID controller card 610, part of the cache flash module 630 and/or part of the cache power module 650.

As mentioned, a write back cache mode may improve performance by storing write data to cache, for example, during periods of high IOPS (e.g., high demand for write operations) where, for example, during a lull, data may then be written from the cache to one or more drives of an array.

During write back operation, as an example, data are written to cache (e.g., DRAM), IO is acknowledged as complete (e.g., to an application that issued the write request), and later the write is flushed to disk. If power is lost while write back cache is enabled, the writes in DRAM may be lost. And where the controller has acknowledged the operation as complete, an application may be unaware of data loss. As mentioned, a BBU option may provide power to a RAID controller (e.g., RAID controller associated cache) in the event that power supplied by equipment (e.g., a server) is interrupted. Such an approach aims to protect the data in the cache until power to the cache can be restored and the data in the cache written to one or more drives. In the example of FIG. 6, the cache flash module 630 and the cache power module 650 aim to provide flash-based cache protection to the RAID controller 610, in a manner that does not incur various BBU downsides.

As an example, the policy circuitry 190 may control the policies implemented by the RAID controller card 610, by the cache flash module 630 and/or by the cache power module 650.

Figure 7:
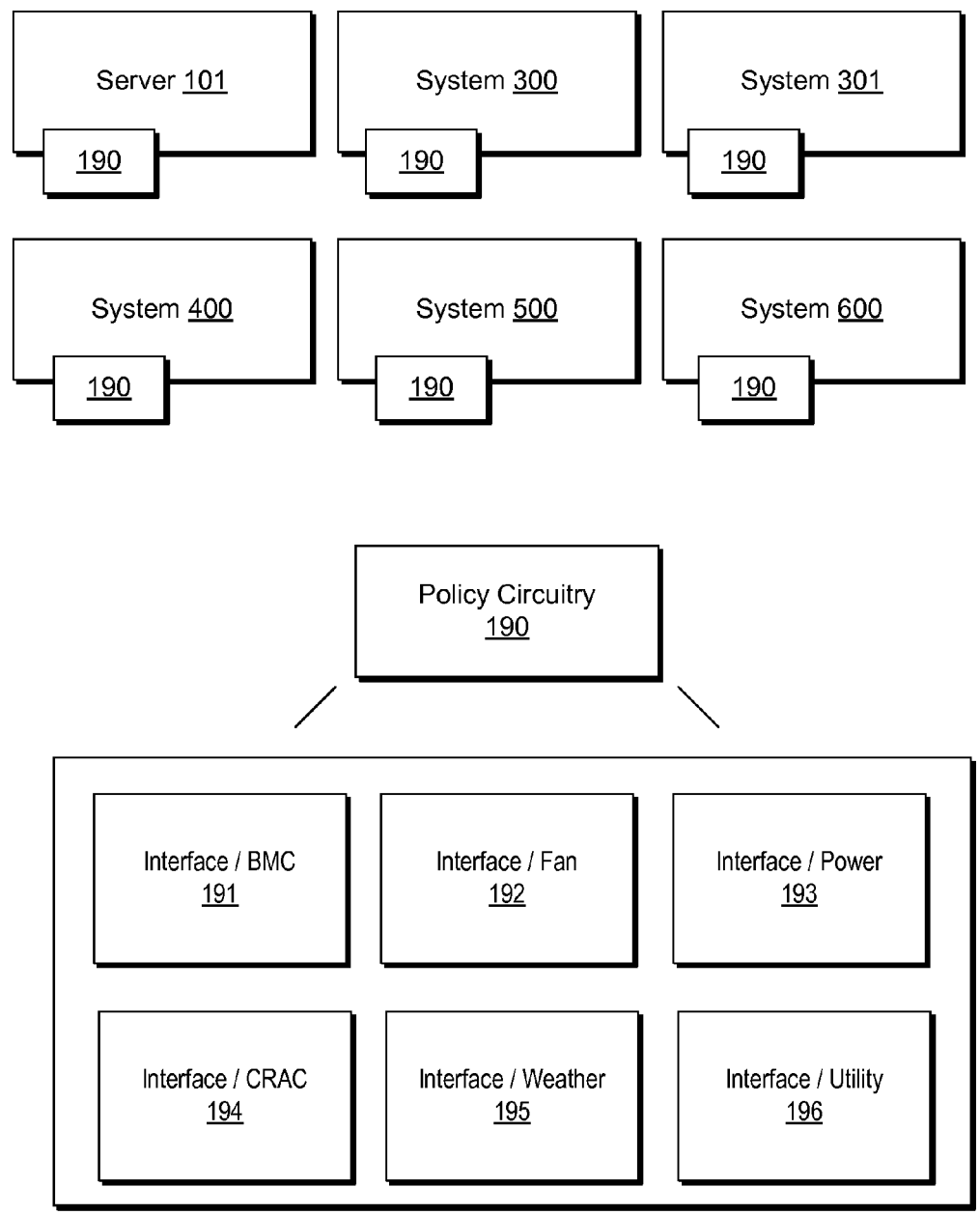
FIG. 7 is a diagram of examples of systems that include an example of policy circuitry.

FIG. 7 shows a block diagram that includes the server 101, the system 300, the system 301, the system 400, the system 500 and the system 600 along with the policy circuitry 190. In the example of FIG. 7, the policy circuitry 190 may include one or more modules such as, for example, a BMC interface module 191, a fan interface module 192, a power interface module 193, a CRAC interface module 194, a weather interface module 195 and a utility interface module 196.

As an example, the policy circuitry 190 may be operatively coupled to a bus such as, for example, an I²C bus. As an example, the policy circuitry 190 may receive signals via a bus, which may be, for example, one or more signals transmitted by a baseboard management controller (BMC) and/or one or more other components of equipment. In such an example, the policy circuitry 190 may include the module 191. As an example, a fan control circuit that may be part of a heat management system may be operatively coupled to the policy circuitry 190. In such an example, the policy circuitry 190 may include the module 192. As an example, a power regulation circuit that may be part of a power management system may be operatively coupled to the policy circuitry 190. In such an example, the policy circuitry 190 may include the module 193. As an example, CRAC circuit that may be part of a facility management system may be operatively coupled to the policy circuitry 190. In such an example, the policy circuitry 190 may include the module 194. As an example, a weather information circuit may be operatively coupled to the policy circuitry 190. In such an example, the policy circuitry 190 may include the module 195. As an example, a power utility circuit may be operatively coupled to the policy circuitry 190. In such an example, the policy circuitry 190 may include the module 196.

Figure 8:
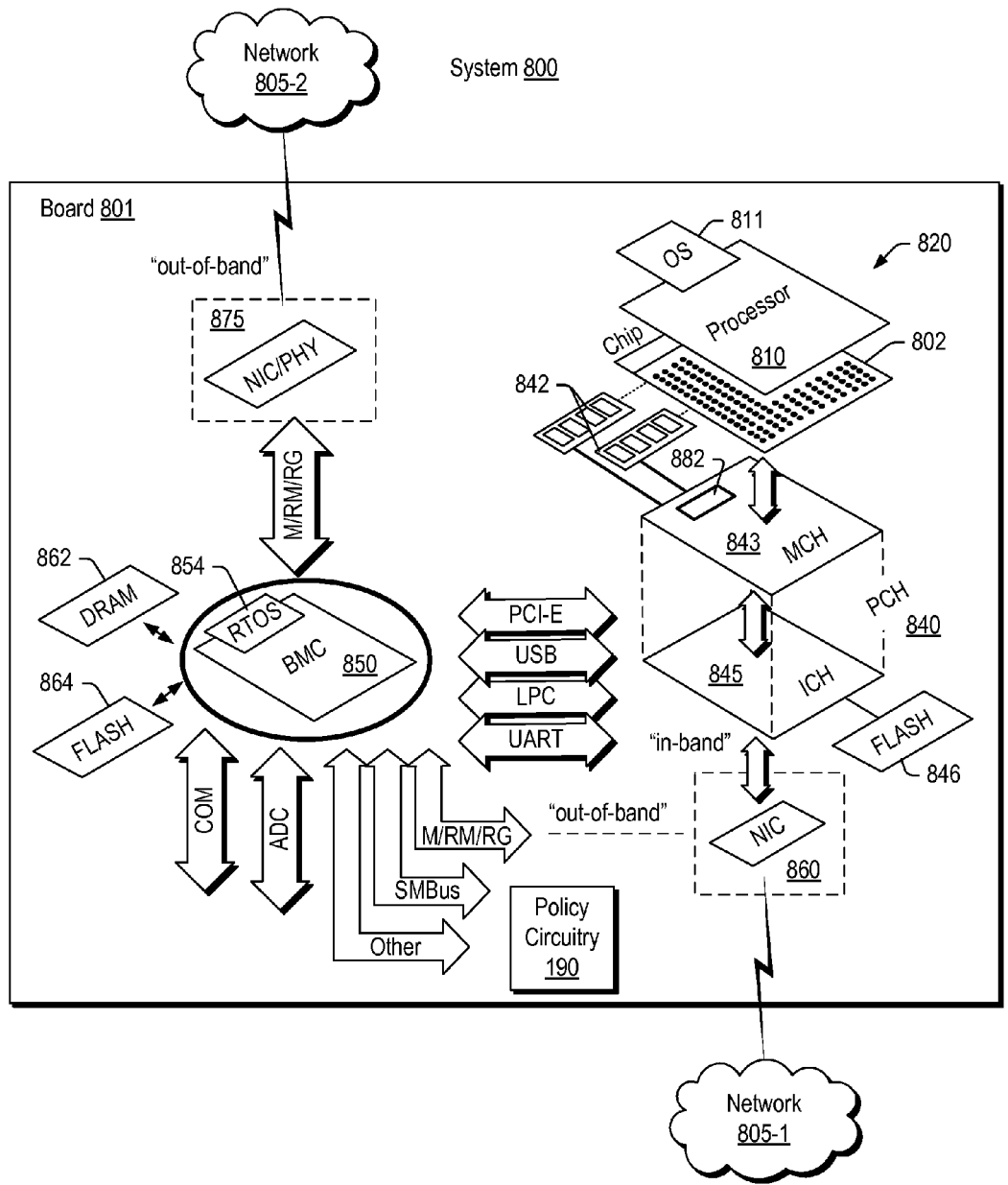
FIG. 8 is a diagram of an example of a system.

FIG. 8 shows an example of a system 800 that includes a board 801 for a processor chip 802, for a PCH 840 and for a controller 850, which may be referred to as a baseboard management controller (BMC) (see, e.g., the controller 150 of FIG. 1). FIG. 8 also shows the policy circuitry 190, which may include an interface that is operatively coupled to the controller 850. As an example, the policy circuitry 190 may be part of a system such as one of the systems of FIG. 7.

As shown in the example of FIG. 8, the processor chip 802 includes a processor 810 that may execute an operating system 811, for example, to establish an operating system environment. In the example of FIG. 8, the processor chip 802 is operatively coupled to a memory controller host (MCH) 843 and an input/output controller host (ICH) 843, which may be, for example, components of the PCH 840. The MCH 843 may be operatively coupled to system memory 842 (see, e.g., the slots 160, 164, 166 and 170 of the circuit board 103 of FIG. 1, which may be occupied with memory) and the ICH 845 may be operatively coupled to a network interface controller (NIC) 860 and include various I/O interfaces. As an example, the ICH 845 may be operatively coupled to flash memory 846 (e.g., SPI flash). As an example, the MCH 843 may include an embedded controller 882. As an example, the chip 802 may provide the processor 810 with access to the memory 842 (see, e.g., where the processor 810 includes appropriate circuitry).

The components illustrated as a vertical stack (right hand side of FIG. 8) may be considered "host" components (e.g., a host 820) that support the establishment of an operating system environment using the processor 810, for example, to execute applications (e.g., using the operating system 811).

In the example of FIG. 8, the controller 850 includes a "real-time" operating system (RTOS) 854 and various interfaces. As an example, the controller 850 may include dedicated network support, for example, via circuitry 875 (e.g., a NIC, PHY circuitry, etc.). As an example, the NIC 860 and/or the circuitry 875 may provide for out-of-band (OOB) communication with the controller 850 (e.g., via the network 805-1 and/or the network 805-2; see, e.g., the module 175 of FIG. 1). As an example, the controller 850 may include one or more MAC modules (e.g., that may be operatively coupled to one or more PHY devices). As an example, a controller may include an IP address, for example, that may differ from an IP address associated with host components on a board (e.g., the controller 850 may include an associated IP address that differs from an associated IP address of the host 820).

In the example of FIG. 8, the controller 850 may include interfaces to access components such as, for example, DRAM 862, flash 864 (e.g., optionally SPI flash), etc. The controller 850 may include interfaces for communication with one or more of the MCH 843 and the ICH 845, for example, via a PCI-express interface (PCI-E), a USB interface, a low pin count interface (LPC), etc. The controller 850 may include an interface configured in compliance with a SMB specification (e.g., a "SMBus" specification). Such an interface may be configured for communications, control, data acquisition, etc. with one or more components on a motherboard (e.g., power related components, temperature sensors, fan sensors, voltage sensors, mechanical switches, clock chips, etc.).

As an example, the controller 850 may be optionally compliant with an Intelligent Platform Management Interface (IPMI) standard. The IPMI may be described, for example, as a message-based, hardware-level interface specification. In a system, an IPMI subsystem may operate independently of an OS (e.g., host OS), for example, via out-of-band communication.

In the example of FIG. 8, as to the OS 811, an OS environment may be established using, for example, a WINDOW® OS (e.g., a full OS), an APPLE® OS, an ANDROID® OS or other OS capable of establishing an environment for execution of applications (e.g., server, word processing, drawing, email, etc.). As an example, as to the RTOS 854, the controller 850 may establish an RTOS environment using an RTOS such as, for example, the NUCLEUS® RTOS, a RISC OS, embedded OS, etc.

As an example, the controller 850 may be an ARC-based BMC (e.g., an ARC4 processor with an I-cache, a D-cache, SRAM, ROM, etc.). As an example, a BMC may include an expansion bus, for example, for an external flash PROM, external SRAM, and external SDRAM. A BMC may be part of a management microcontroller system (MMS), which, for example, operates using firmware stored in ROM (e.g., optionally configurable via EEPROM, strapping, etc.).

As an example, the controller 850 may be configured to perform tasks associated with one or more sensors (e.g., scanning, monitoring, etc.), for example, as part of an IPMI standard management scheme. As an example, a sensor may be or include a hardware sensor (e.g., for temperature, etc.) and/or a software sensor (e.g., for states, events, etc.). As an example, a controller (e.g., a BMC) may provide for out-of-band management of a computing device (e.g., an information handling system), for example, via a network interface.

As an example, a controller may be configured to implement one or more server-related services. For example, a chipset may include a server management mode (SMM) interface managed by a BMC. In such an example, the BMC may prioritize transfers occurring through the SMM interface. In such an example, the BMC may act as a bridge between server management software (SMS) and IPMI management bus (IPMB) interfaces. Such interface registers (e.g., two 1-byte-wide registers) may provide a mechanism for communications between the BMC and one or more host components.

As an example, a controller (e.g., the controller 850) may store configuration information in protected memory (see, e.g., the DRAM 862, the flash 864, etc.). As an example, a controller may store information that may include the name(s) of appropriate "whitelist" management servers (e.g., for a company, etc.). As an example, the controller 850 may be operable in part by using instructions stored in memory such as the DRAM 862 and/or the flash 864. As an example, such instructions may provide for implementation of one or more methods that include monitoring, assessing, etc. operation of the processor chip 802 by the controller 850.

As an example, the NIC 860 of the system 800 of FIG. 8 may be a LAN subsystem PCI bus network adapter configured to monitor network traffic, for example, at a so-called Media Independent Interface (MII), a Reduced Media Independent Interface (RMII), a Reduced Gigabit Media Independent Interface (RGMII), etc. As an example, the NIC 860 may include various features, for example, a network adapter may include a Gigabit Ethernet controller, a LAN connector, a CSMA/CD protocol engine, a LAN connect interface between a PCH and a LAN controller, PCI bus power management, ACPI technology support, LAN wake capabilities, ACPI technology support, LAN subsystem software, etc.

As an example, the controller 850 may be operatively coupled to one or more host components via a SMBus (e.g., a SMLink) (e.g., or other bus).

As an example, the controller 850 may control one or more timers such as, for example, one or more watchdog timers (WDTs). As an example, a timer may be programmed to call for a reset operation, a power down operation, etc., which may alter information in memory, state of a processor, etc. By controlling one or more timers, the controller 850 may act to preserve information. As an example, by controlling a timer or timers, a controller 850 may proceed with various operations (e.g., debugging operations) with reduced risk of interference from timer associated action(s).

As an example, the policy circuitry 190 may receive information from the controller 850 as to one or more WDTs. For example, where the controller 850 calls for a reset operation, a power down operation, etc., the policy circuitry 190 may receive a signal and control one or more operations of a RAID controller or associated circuitry based at least in part on the signal. For example, where a controller 850 calls for action that may interrupt power, the policy circuitry 190 may respond by switching RAID operations from one write policy to another write policy (e.g., write back to write through).

As an example, the controller 850 may be provided with access to information associated with one or more other components of a system. For example, where a component includes a driver, the controller 850 may access information about the driver; where a component includes memory (e.g., cache, etc.), the controller 850 may access that memory; where a component has operational states, the controller 850 may access state information; etc. As an example, the controller 850 may alter a driver, store values to memory, place a device in an operational state, etc., for example, as part of a monitoring process, a debugging process, etc.

As an example, the board 801 may include components such as those marketed by Intel Corporation (Santa Clara, Calif.). As an example, one or more components of the host 820 may support the Intel® Active Management Technology (AMT), as a hardware-based technology for remotely managing and securing computing systems in out-of-band operational modes. In the example of FIG. 8, the Intel® AMT may be implemented using components of the host 820. For example, Intel® AMT may be realized using an ARC4 chip as the embedded controller 882 in the MCH 843 of the host 820 to instantiate the so-called Intel® Management Engine (ME) via code that resides in the same flash memory (e.g., the flash memory 846) as that of host BIOS (e.g., accessible via the ICH 845). The Intel® ME shares a common LAN MAC, hostname, and IP address with the host (e.g., the host OS). The Intel® ME relies on a so-called out-of-band filter to filter information received via a LAN interface (see, e.g., the NIC 860 of FIG. 8).

As an example, a controller may be separate from a host, for example, consider an Aspeed® AST1XXX or 2XXX series controller marketed by Aspeed Technology Inc. (Hsinchu, TW). As an example, the controller 850 of FIG. 8 may include at least some features of an Aspeed® controller.

As an example, the system 800 may be part of a server. As an example, a server may include RAID hardware (e.g., RAID controller, adapters, etc.). As an example, a server may include hypervisor instructions for establishing a hypervisor environment, for example, to support virtual OS environments, etc. As an example, a server may include a controller such as, for example, a controller that includes at least some features of an Aspeed® controller.

As an example, the controller 150 of the circuit board 103 of FIG. 1 or the controller 850 of the board 801 of FIG. 8 may be an Aspeed® controller or include at least some features of such a controller. As an example, the controller connector module 175 of the circuit board of FIG. 1 or the circuitry 875 of the board 801 of FIG. 8 may be configured to operatively couple to an Aspeed® controller or a controller that includes at least some features of such a controller. As an example, circuitry may operatively couple a network interface (e.g., network adapter, PHY circuitry, etc.) to the controller 150 or the controller 850, for example, where the controller connector module 175 or the circuitry 875 includes the network interface (e.g., network adapter, PHY circuitry, etc.).

As an example, the server 101 of FIG. 1 (e.g., or the circuit board 103 of FIG. 1 or the board 801 of FIG. 8) may include a socket for a network interface controller (NIC) that may include, for example, one or more features of an Ethernet controller, for example, a GbE controller, etc.

As an example, the policy circuitry 190 may be operatively coupled to a network interface. As an example, a network interface may "decode" a signal where the signal may pertain to a power status. As an example, a signal may be from a weather service, from a CRAC, from a utility company, etc. As an example, a weather service may issue a signal via the Internet where receipt of that signal indicates one or more weather conditions, which may be current or pending. For example, where a tornado, a hurricane, an electrical storm, etc. are forecast or detected (e.g., via radar, reports, etc.), the weather service may issue a signal that can be received by equipment, optionally in an out-of-band manner, that causes the equipment to alter, for example, a write policy as associated with an array of drives.

As an example, where a server facility (e.g., a server farm) includes a CRAC, the CRAC may include a network interface that can automatically issue a signal that may be received by equipment (e.g., directly or indirectly) in the facility such that one or more write policies are set, altered, adjusted, ensured, etc. For example, if a CRAC is to be taken off-line for service, temperature in the facility may rise. Such a temperature rise may place equipment at risk for shutdown or other instabilities. In such an example, the CRAC (e.g., or facility operator/controller) may issue an instruction via an in-band, out-of-band or other manner by which servers respond to minimize risk of data loss by control of one or more write policies.

Figure 9:
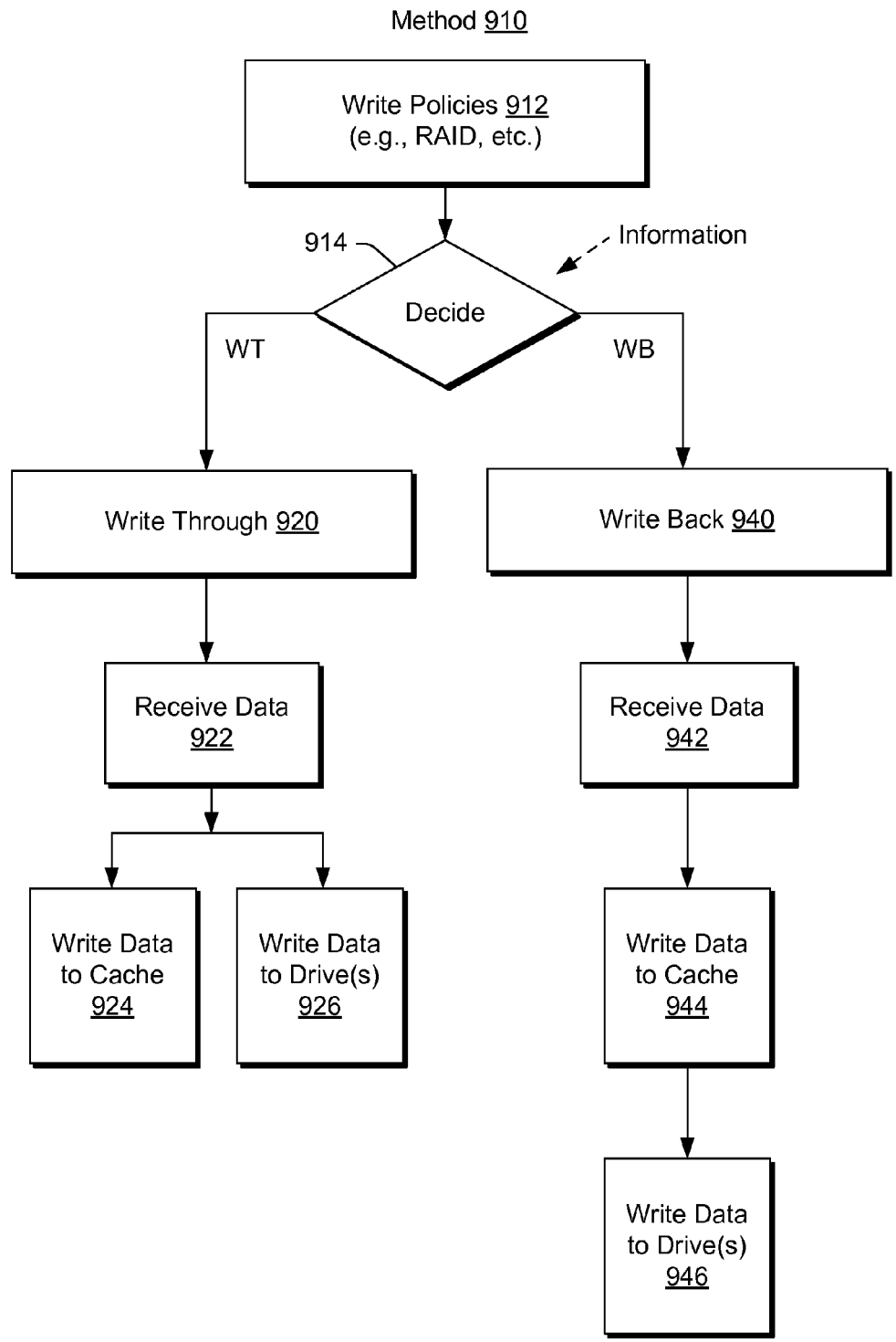
FIG. 9 is a diagram of an example of a method.

FIG. 9 shows an example of a method 910 that includes a write policies block 912 for providing, receiving, determining, setting, etc. a plurality of write policies. The method 910 also includes a decision block 914 for deciding whether to implement a write through policy per a block 920 or a write back policy per a block 940. As an example, the decision block 914 may include receiving information from one or more sources. As an example, the decision block 914 may make one or more decisions based on information such as a schedule, a time (e.g., a time of day, a time of a week, etc.), configuration information, power-related information, etc. As an example, the decision block 914 may decide to implement a policy such as a policy of the block 920, a policy of the block 940 or optionally another policy (e.g., to suspend operation, etc.).

The write through policy block 920 includes a reception block 922 for receiving data, a write data to cache block 924 for writing data to cache and a write data to one or more drives block 926 for writing data to one or more drives. As shown, the write blocks 924 and 926 are in parallel.

The write back policy block 940 includes a reception block 942 for receiving data, a write data to cache block 944 for writing data to cache and a write data to one or more drives block 946 for writing data to one or more drives. As shown, the write blocks 944 and 946 are in series.

As an example, a method can include a decision block for deciding whether to implement a consistency check policy. For example, with respect to an array of drives, a consistency check policy can be implemented for verifying correctness of data in the array of drives. For example, in a system with parity, checking consistency can include computing the parity of the data drives and comparing the results to the contents of the parity drive (see, e.g., aforementioned RAID levels, etc.). As an example, a decision block may make one or more decisions based on information such as a schedule, a time (e.g., a time of day, a time of a week, etc.), configuration information, power-related information, etc. As an example, the decision block 914 may include making one or more decisions as to consistency checking, for example, in addition to making one or more decisions as to writing policies.

As an example, a consistency check may aim to detect parity and block errors. As an example, a consistency checking process may include reporting, for example, generating an inconsistency log. As an example, if individual read errors (e.g., bad blocks) occur during a consistency check process (e.g., and sufficient redundant data are available), such blocks may be re-written with correct data. As an example, a policy may include setting, adjusting, altering, etc. a check process. As an example, a check process may be, for example, a thorough consistency check process, a random scan of a RAID array check process (e.g., that aims to seek out errors where, if an error is found, a thorough consistency check process may be implemented), etc.

Figure 10:
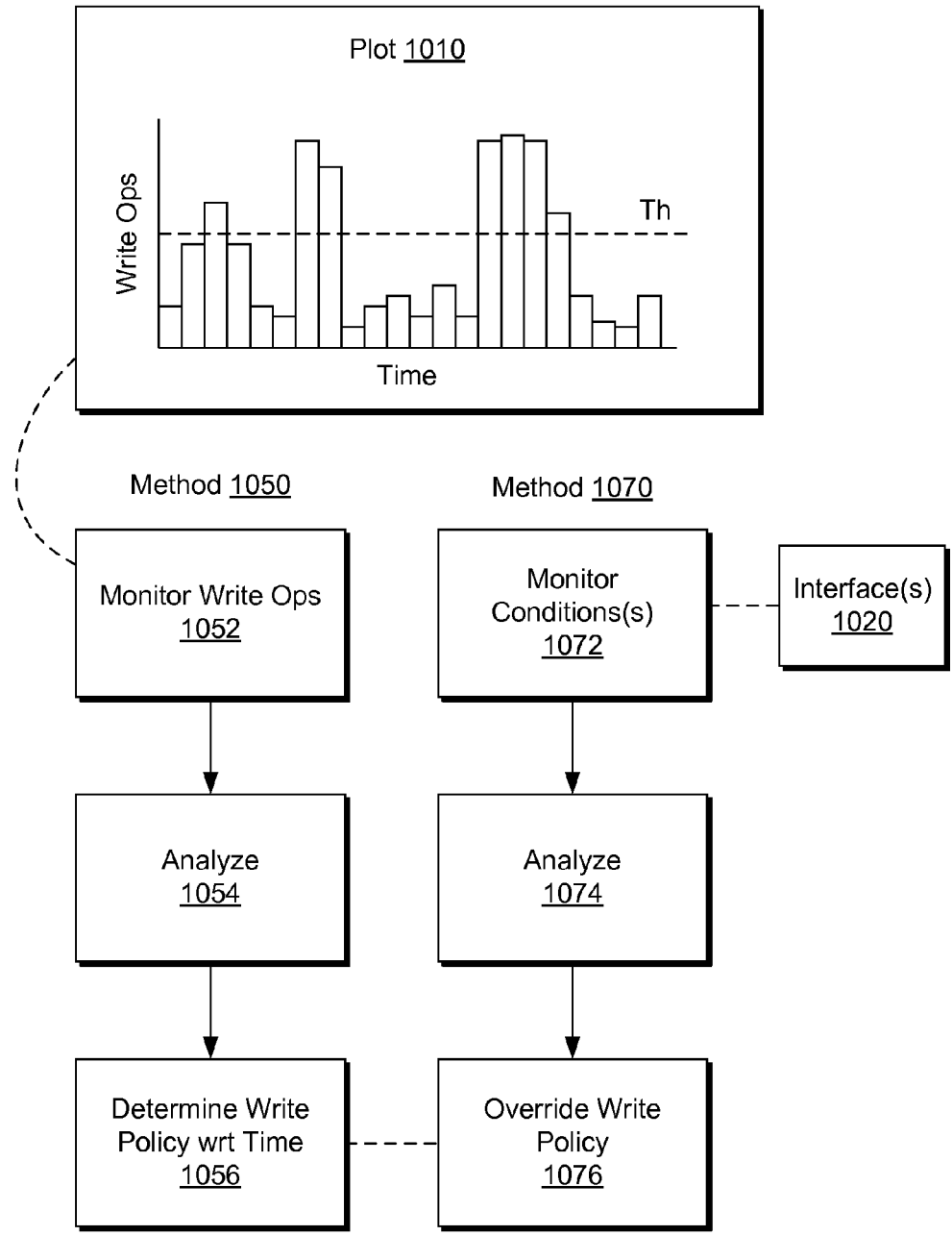
FIG. 10 is a diagram of an example of a method.

FIG. 10 shows an example of a plot 1010 of write operations with respect to time, an example of one or more interfaces 1020, an example of a method 1050 and an example of a method 1070.

The plot 1010 includes a threshold (Th), which may be a threshold that can be used to determine when a particular write policy or write policies can be implemented. For example, where historical information as to write operations with respect to time indicate a pattern that is substantially reoccurring, write policy decision making and implementation of one or more write policies may be based at least in part on the pattern. For example, where time is substantially reoccurring within a margin (e.g., within a margin of about 20 percent or less as to start time and end time) for a reoccurring number of write operations substantially within a margin (e.g., within a margin of about 20 percent or less), a schedule may be formulated as to write policies with respect to time. As mentioned, where a high number of write operations occur (e.g., at or above the threshold) for particular times, a write back policy may be implemented (see, e.g., the write back policy block 940 of FIG. 9); whereas, for other times, a write through policy may be implemented (see, e.g., the write through policy block 920 of FIG. 9).

In FIG. 10, the method 1050 includes a monitor block 1052 for monitoring write operations with respect to time, an analysis block 1054 for analyzing write operations and a determination block 1056 for determining one or more write policies with respect to time. In such an example, the one or more determined write policies may be implemented according to a schedule (e.g., a time of day, time of a week, etc.).

In FIG. 10, the method 1072 includes a monitor block 1072 for monitoring one or more conditions, optionally via information received through one or more of the one or more interfaces 1020, an analysis block 1074 for analyzing one or more conditions and an override block 1076 for overriding one or more write policies. For example, where the method 1050 may call for implementing one or more write policies (e.g., of the determination block 1056), the override block 1075 of the method 1070 may call for overriding an implemented or yet to be implemented write policy. For example, where a condition is associated with an unstable power state, the override block 1075 may override an implemented write back policy (see, e.g., the write back policy block 940 of FIG. 9) by implementing a write through policy (see, e.g., the write through policy block 920 of FIG. 9), which may act to preserve data where the unstable power state results in a power failure (e.g., a failure to supply power to at least a cache associated with an array of drives).

Figure 11:
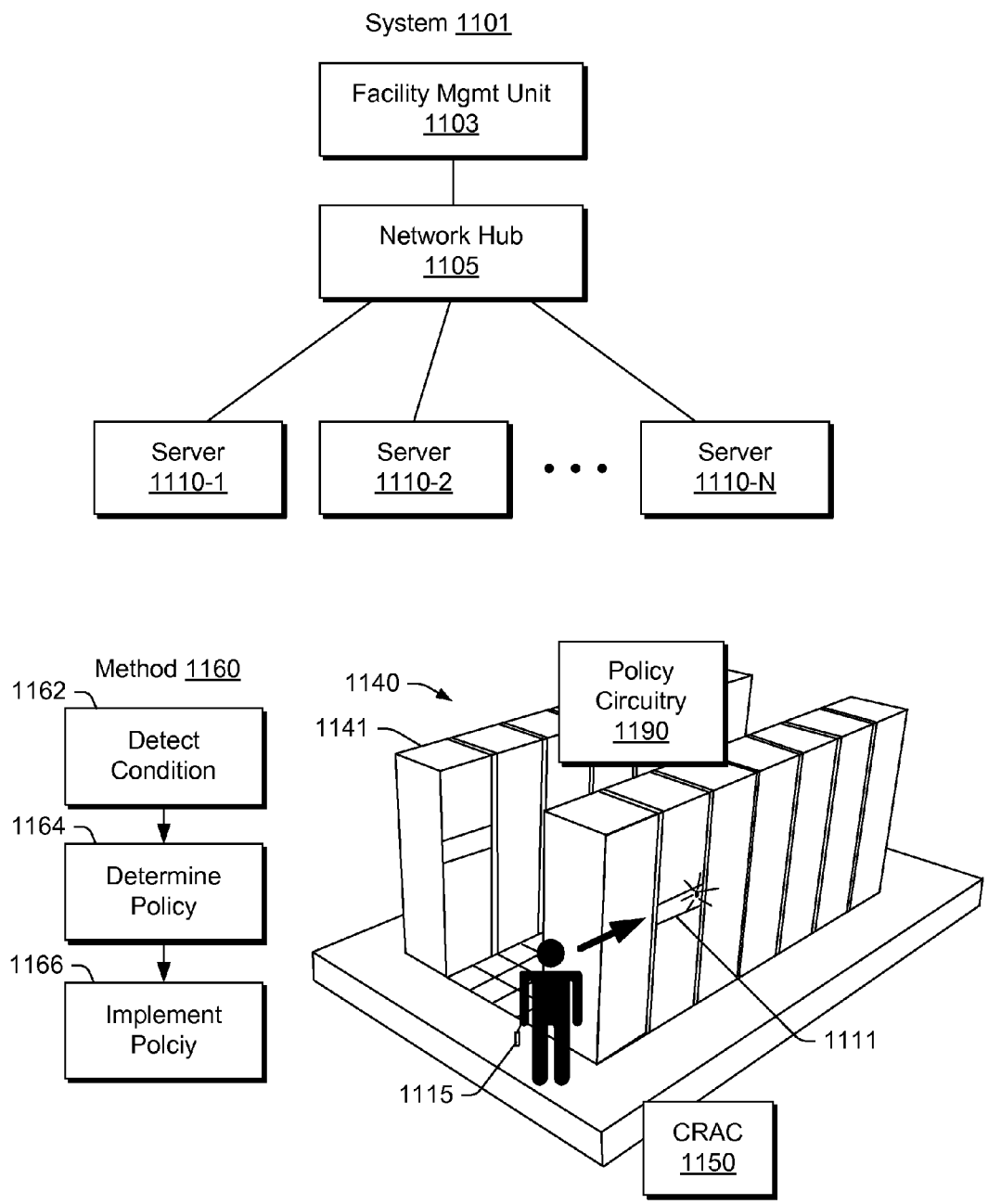
FIG. 11 is a diagram of an example of a system, an example of a server facility and an example of a method.

FIG. 11 shows an example of a system 1101 that includes a management unit 1103, a network hub 1105 (e.g., network equipment) and servers 1110-1, 1110-2, . . . , 1110-N.

FIG. 11 also shows an example of a system 1140 that may include servers such as one or more of the servers 1110-1, 1110-2, . . . , 1110-N. Specifically, the system 1140 is shown as including racks 1141 where each rack can include servers. As an example, the system 1140 may include a CRAC 1150, for example, to maintain environmental conditions conducive to operation of servers. As an example, the facility management unit 1103 may provide for control of the CRAC 1150 as well as other aspects of the system 1140 (e.g., via the network hub 1105, etc.). As an example, the facility management unit 1103 may receive information from the CRAC 1150 and transmit such information to one or more servers, for example, such that the information may be used in making one or more decisions as to transfer of data (e.g., one or more write policies), consistency checking of data, power state, cooling, etc.

In the example of FIG. 11, a particular server 1111 is identified, for example, to be managed by a worker. As shown, the worker may carry a component 1115 (e.g., a FRU, etc.) or, for example, a storage device that may include instructions for execution by a controller, a host processer, etc. In such an example, the server 1111 may update a configuration per installation of the component 1115 where the updated configuration is received as configuration information by policy circuitry 1190 (see, e.g., the policy circuitry 190, etc.). In such an example, the policy circuitry 1190 may update one or more write policies based at least in part on such configuration information. Such an approach may update one or more policies and/or how one or more policies are implemented. As an example, the component may be a BBU, an expander card, a cache or other component that may be part of a RAID system.

FIG. 11 also shows a method 1160 that includes a detection block 1162 for detecting a condition, a determination block 1164 for determining a policy and an implementation block 1166 for implementing a policy. Such a method may include selecting and implementing a write policy based at least in part on a detected condition. As an example, where a schedule exists for write policies with respect to time, a condition may be a time (e.g., a time of day, etc.). As an example, a detected condition may be associated with a particular server. As an example, a detected condition may be associated with a system such as the system 1140. As an example, a detected condition may be associated with a CRAC such as the CRAC 1150. As an example, a detected condition may be a weather-related condition. As an example, a detected condition may be a condition communicated by a utility company, for example, that supplies power to the system 1140 (e.g., manageable via a facility management unit, etc.).

As an example, an apparatus can include an interface; cache memory; a plurality of drives; and a controller that includes detection circuitry, a write through mode (e.g., parallel) and a write back mode (e.g., serial), where the write through mode (e.g., parallel) writes information received via the interface to the plurality of drives, where the write back mode (e.g., serial) writes information received via the interface to the cache memory and writes information written to the cache memory to the plurality of drives, and where the detection circuitry selects the write through mode (e.g., parallel) based at least in part on detection of a first condition and selects the write back mode (e.g., serial) based at least in part on detection of a second condition, wherein the first condition and the second condition differ. As an example such a controller can include a consistency check mode and a non-consistency check mode where the detection circuitry selects the consistency check mode or the non-consistency check mode based at least in part on detection of a condition. As an example, as to a write policy, a plurality of drives may be a number of drives that is less than a number of drives in a system or, for example, a plurality of drives may be a total number of drives.

As an example, a first condition can be a first time associated with a first rate of input operations associated with an interface and a second condition can be a second time associated with a second rate of input operations associated with the interface where the second rate exceeds the first rate. In such an example, the input operations may be write operations.

As an example, a first rate of input operations may be below a rate threshold and a second rate of input operations may exceed a rate threshold. In such an example, the input operations may be write operations.

As an example, a first condition may be a first power state and a second condition may be a second power state (e.g., that differs from the first power state). In such an example, the first condition can be an unstable power state condition and the second condition can be a stable power state condition.

As an example, a first condition and a second condition can be or include environmental state conditions. For example, consider conditions associated with one or more of a voltage regulator, high power demand, weather, temperature, fans, thunderstorms/electrical storms, a CRAC, water levels, rain, flooding, etc.

As an example, a first condition can be an environmental state condition that corresponds to an unstable power state and a second condition can be an environmental state condition that corresponds to a stable power state.

As an example, detection circuitry may adjust at least one parameter value based at least in part on a detected condition, where the at least one parameter value includes a threshold parameter value, and where the detection circuitry selects a write through mode (e.g., parallel) or a write back mode (e.g., serial) based at least in part on the threshold parameter value.

As an example, a detected condition may be a time. For example, a first detected condition may be a first time and a second detected condition may be a second time. As an example, an apparatus may include a schedule that includes at least one scheduled write through mode time and/or that includes at least one scheduled write back mode time.

As an example, one or more computer-readable storage media can include processor-executable instructions, the instructions including instructions to: detect a first condition; detect a second, different condition; and select a write through mode (e.g., parallel) responsive to detection of the first condition and select a write back mode (e.g., serial) responsive to detection of the second condition where the write through mode (e.g., parallel) writes information received via an interface to a plurality of drives and wherein the write back mode (e.g., serial) writes information received via the interface to cache memory and writes information written to the cache memory to the plurality of drives. In such an example, the instructions can include instructions to: adjust at least one parameter value based at least in part on a detected condition where the selecting is based at least in part on the at least one parameter value.

As an example, a method can include receiving information via an interface; writing the information to cache memory; writing the information from the cache memory to a plurality of drives; receiving additional information via the interface; detecting a condition by receiving information from a baseboard management controller; and responsive to the condition, writing the additional information directly to the plurality of the drives. In such an example, the condition may be a rate of input operations (e.g., write requests, write operations, etc.). As an example, a baseboard management controller may be a baseboard management controller of a server.

As an example, a system may include a hypervisor, for example, executable to manage one or more operating systems. With respect to a hypervisor, a hypervisor may be or include features of the XEN® hypervisor (XENSOURCE, LLC, LTD, Palo Alto, Calif.). In a XEN® system, the XEN® hypervisor is typically the lowest and most privileged layer. Above this layer one or more guest operating systems can be supported, which the hypervisor schedules across the one or more physical CPUs. In XEN® terminology, the first "guest" operating system is referred to as "domain 0" (dom0). In a conventional XEN® system, the dom0 OS is booted automatically when the hypervisor boots and given special management privileges and direct access to all physical hardware by default. With respect to operating systems, a WINDOWS® OS, a LINUX® OS, an APPLE® OS, or other OS may be used by a computing platform.

As described herein, various acts, steps, etc., can be implemented as instructions stored in one or more computer-readable storage media. For example, one or more computer-readable storage media can include computer-executable (e.g., processor-executable) instructions to instruct a device. As an example, a computer-readable storage medium may be a computer-readable storage medium that is not a carrier wave.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 12:
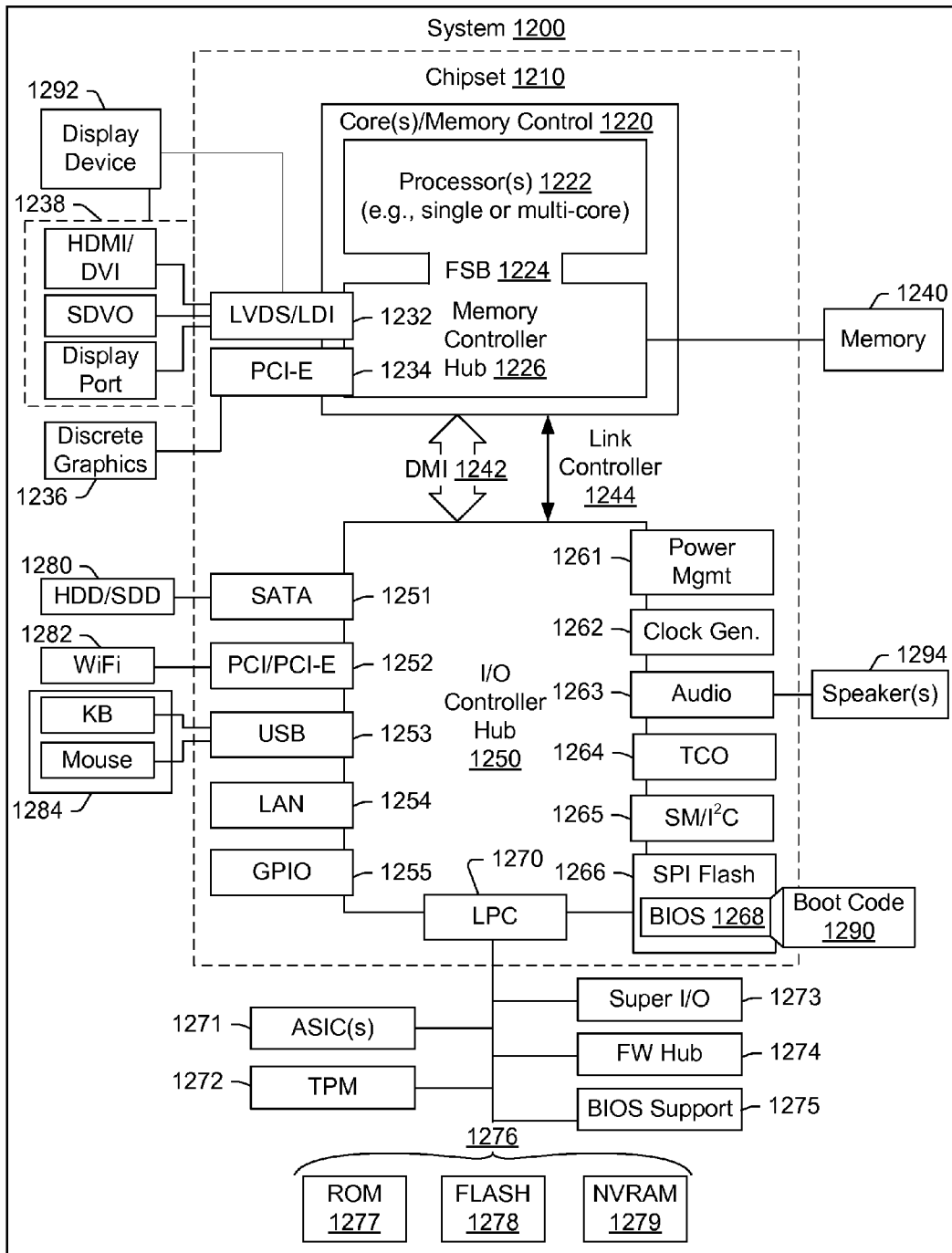
FIG. 12 is a diagram of an example of various components of a machine (e.g., a device, a system, etc.).

While various examples circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, N.C., a workstation computer, such as one of the ThinkStation® computers, a server such as the ThinkServer® servers, which are sold by Lenovo (US) Inc.

of Morrisville, N.C.; however, as apparent from the description herein, another machine may include other features or only some of the features of the system 1200.

As shown in FIG. 12, the system 1200 includes a so-called chipset 1210. A chipset refers to a group of integrated circuits, or chips, that are designed to work together. Chipsets are usually marketed as a single product (e.g., consider chipsets marketed under the brands Intel®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (×16) PCI-E port for an external PCI-E-based graphics card. A system may include AGP or PCI-E for support of graphics.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), mice and various other devices (e.g., cameras, phones, storage, media players, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system or component seeking access is the expected system or component.

The system 1200, upon power on, may be configured to execute boot code 1290 for the BIOS 1268, as stored within the SPI Flash 1266, and thereafter processes data under the control of one or more operating systems and application software (e.g., stored in system memory 1240).

As an example, the system 1200 may include circuitry for communication via a cellular network, a satellite network or other network. As an example, the system 1200 may include battery management circuitry, for example, smart battery circuitry suitable for managing one or more lithium-ion batteries.

CONCLUSION

Although various examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. An apparatus comprising:
   an interface;
   volatile cache memory;
   a plurality of non-volatile drives; and
   a controller that comprises detection circuitry, a write through mode and a write back mode, and a consistency check mode,
   wherein the write through mode writes information received via the interface to the plurality of non-volatile drives,
   wherein the write back mode writes information received via the interface to the volatile cache memory and writes information written to the volatile cache memory to the plurality of non-volatile drives, and
   wherein the detection circuitry automatically selects the write through mode and enables the consistency check mode based at least in part on detection of a first condition and automatically selects the write back mode and disables the consistency check mode based at least in part on detection of a second condition, wherein the first condition and the second condition differ; and wherein the first condition comprises a first rate of input operations for writing information received via the interface and wherein the second condition comprises a second rate of input operations for writing information received via the interface wherein the second rate exceeds the first rate.

2. The apparatus of claim 1 wherein the first rate of input operations is below a rate threshold.

3. The apparatus of claim 1 wherein the second rate of input operations exceeds a rate threshold.

4. The apparatus of claim 1 wherein the detection circuitry automatically selects the write through mode based at least in part on detection of a first power state condition and automatically selects the write back mode based at least in part on detection of a second power state condition, wherein the first power state condition and the second power state condition differ.

5. The apparatus of claim 4 wherein the first power state condition is an unstable power state condition.

6. The apparatus of claim 4 wherein the second power state condition is a stable power state condition.

7. The apparatus of claim 1 wherein the detection circuitry automatically selects the write through mode based at least in part on detection of a first environmental state condition and automatically selects the write back mode based at least in part on detection of a second environmental state condition, wherein the first environmental state condition and the second environmental state condition differ.

8. The apparatus of claim 7 wherein the first environmental state condition that corresponds to an unstable power state.

9. The apparatus of claim 7 wherein the second environmental state condition that corresponds to a stable power state.

10. The apparatus of claim 1 wherein the detection circuitry adjusts at least one parameter value based at least in part on a detected condition, wherein the at least one parameter value comprises a threshold parameter value, and wherein the detection circuitry selects the write through mode or the write back mode based at least in part on the threshold parameter value.

11. The apparatus of claim 1 wherein the detected condition comprises a time.

12. The apparatus of claim 11 comprising a schedule that comprises at least one scheduled write through mode time.

13. The apparatus of claim 11 comprising a schedule that comprises at least one scheduled write back mode time.

14. One or more non-transitory computer-readable storage media comprising processor-executable instructions, the instructions comprising instructions to:

detect a first condition;

detect a second, different condition; and automatically select a write through mode and enable a consistency check mode responsive to detection of the first condition and automatically select a write back mode and disable the consistency check mode responsive to detection of the second condition wherein the write through mode writes information received via an interface to a plurality of non-volatile drives wherein the write back mode writes information received via the interface to volatile cache memory and writes information written to the volatile cache memory to the plurality of non-volatile drives and wherein the first condition comprises a first rate of input operations for writing information received via the interface and wherein the second condition comprises a second rate of input operations for writing information received via the interface wherein the second rate exceeds the first rate.

15. The one or more non-transitory computer-readable storage media of claim 14 wherein the instructions comprise instructions to: adjust at least one parameter value based at least in part on a detected condition wherein at least one of the automatic selections occurs based at least in part on the at least one parameter value.

16. A method comprising:

receiving information via an interface of a server wherein the server comprises a host processor, a redundant array drive controller, and a baseboard management controller;

in a write back mode with a consistency check mode disabled, writing the information to cache memory of the server and writing the information from the cache memory to a plurality of drives of the server that form the redundant array;

receiving additional information via the interface;

detecting a condition via the redundant array drive controller by receiving information from the baseboard management controller of the server; and responsive to the condition, in a write through mode with the consistency check mode enabled, writing the additional information directly to the plurality of the drives.

17. The method of claim 16 wherein the condition comprises a rate of input operations.

18. The method of claim 16 wherein the consistency check mode comprises verifying correctness of information in at least a portion of the redundant array at least in part by comparing to content of a parity drive in the redundant array.

* * * * *